United States Patent [19]

Watkins et al.

[11] Patent Number: 4,992,639
[45] Date of Patent: Feb. 12, 1991

[54] COMBINED EDM AND ULTRASONIC DRILLING

[75] Inventors: James R. Watkins, Bristol; Mohamed F. El-Menshawy, Birmingham, both of England

[73] Assignees: Rolls-Royce plc; Spark Tec Ltd., both of England

[21] Appl. No.: 426,717

[22] Filed: Oct. 26, 1989

[30] Foreign Application Priority Data

Oct. 26, 1988 [GB] United Kingdom ............... 8825064

[51] Int. Cl.⁵ ............................................. B23H 5/04
[52] U.S. Cl. ................................... 219/69.2; 219/69.17
[58] Field of Search ................ 219/69.14, 69.2, 69.17; 204/129.46, 224 M

[56] References Cited

U.S. PATENT DOCUMENTS

| | | | |
|---|---|---|---|
| 4,134,807 | 1/1979 | Briffod | 204/129.5 |
| 4,641,007 | 2/1987 | Lach | 219/69.2 |
| 4,754,115 | 6/1988 | Rhoades | 219/69.15 |

FOREIGN PATENT DOCUMENTS 2060459  5/1981  United Kingdom ............ 219/69.17

Primary Examiner—Geoffrey S. Evans
Attorney, Agent, or Firm—Oliff & Berridge

[57] ABSTRACT

To drill small holes in a metal component having a non-conductive, e.g. ceramic, surface layer apparatus is provided capable of carrying out both ultrasonic and EDM drilling operations without dismounting the component. The drilling operation commences with an ultrasonic drilling phase and change over to essentially EDM operation when breakthrough of the ceramic surface layer is detected. Breakthrough is detected by applying a low voltage pulse signal to a drilling electrode and sensing when current starts to flow between the electrode and the workpiece. When a multiplicity of holes are drilled simultaneously the changeover to EDM is triggered by breakthrough of the first electrode but may be delayed to permit the remaining electrodes to breakthrough.

24 Claims, 3 Drawing Sheets

COMBINED EDM AND ULTRASONIC DRILLING

BACKGROUND OF THE INVENTION

This invention relates to the machining of components comprising a substantially electrically non-conductive layer applied to an electrically conductive substrate. In particular the invention concerns a method and apparatus for machining through an undoped ceramic material coating applied to a metal substrate.

Electro discharge machining (EDM) is well known as a method of drilling small holes through metal components such as gas turbine blades and guide vanes. In an EDM process pulses of positive electrical potential are applied to an electrode held close to the surface of a component where a hole is to be drilled while the component is negatively biased. Dielectric fluid is supplied to the gap between the component and the electrode and a succession of voltage pulses are applied to the electrode to produce the machining sparks.

EDM enables a multiplicity of holes to be drilled simultaneously using a multi-wire head. The process is relatively quick, cheap, accurate and produces an acceptable finish in the super alloy metals normally used for gas turbine components. However, EDM cannot be used to form holes through electrically non-conductive ceramic because of its insulating properties.

SUMMARY OF THE INVENTION

According to the present invention apparatus for electro discharge machining a small hole in an electrically conductive workpiece having a substantially non-conductive surface layer comprises EDM electrode means the position of which relative to the workpiece is adjustable to form a machining gap, dielectric supply means for supplying dielectric fluid into the region of the machining gap, power supply means connected in use between the electrode means and the workpiece and arranged when operative to produce machining pulse for electro-discharge machining through the conductive workpiece, ultrasonic means for imparting to the electrode means ultrasonic vibrations in an axial direction for ultrasonically machining through the non-conductive layer, control means for sequencing the ultrasonic and EDM machining operations in separate phases, and detection means responsive to establishment of electrical continuity between the EDM electrode means and the conductive substrate to commence the electro-discharge machining phase of the conductive workpiece after breakthrough of the non-conductive layer is detected in the ultrasonic machining phase.

The invention may be utilised to drill a plurality of holes simultaneously in which case the EDM electrode means comprises a plurality of EDM electrodes mounted in a common electrode head. In such an arrangement the detection means is operatively responsive to breakthrough of a first electrode. Preferably the arrangement further comprises delay means connected with the detection means and the power supply means to delay commencement of the EDM machining phase for a predetermined period after detection of breakthrough of the non-conductive layer.

The invention will now be described by way of an example with reference to the accompanying drawings in which;

DETAILED DESCRIPTION OF THE PREFERRED EMBODIMENT

Figure 1:
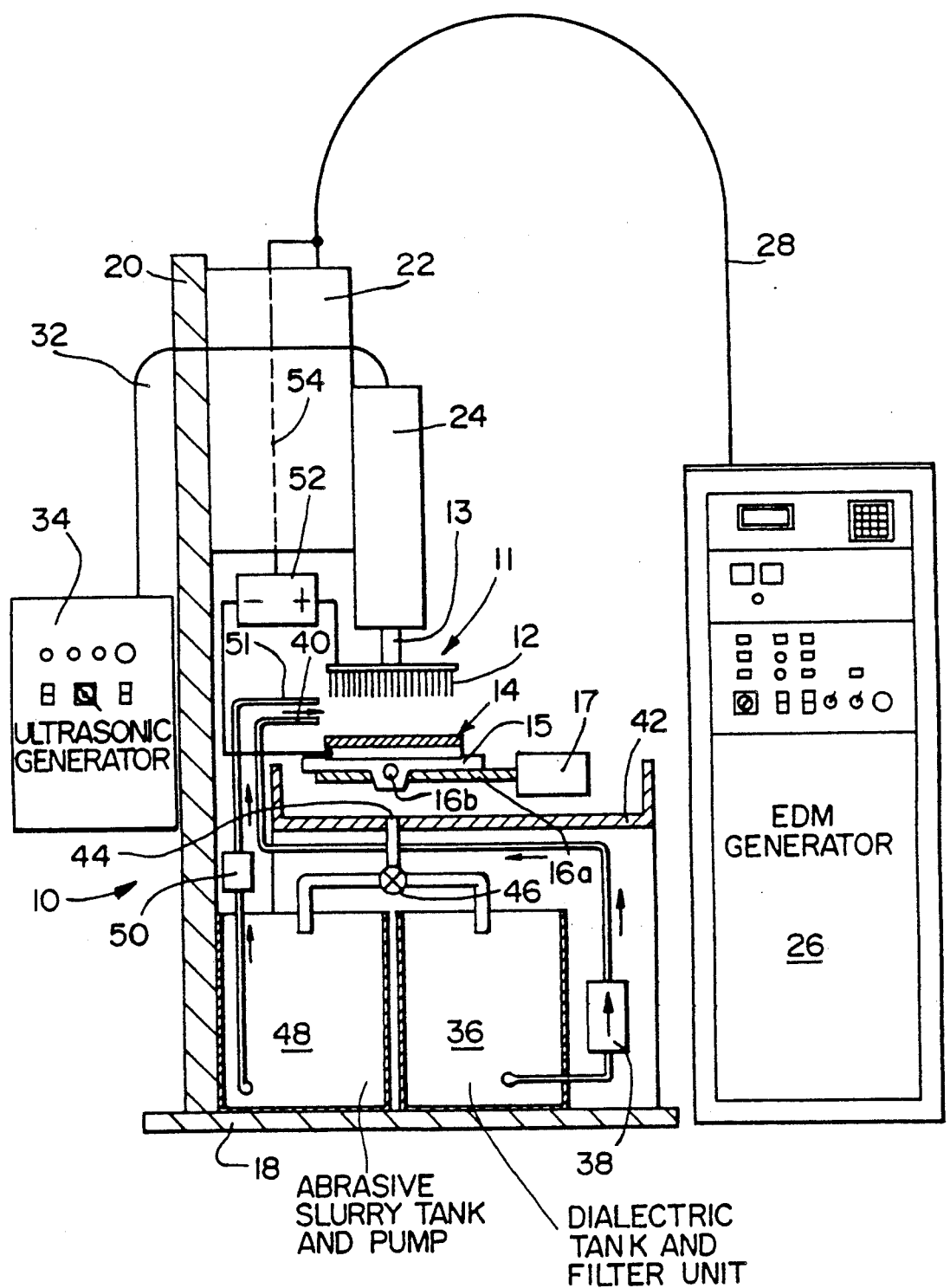
FIG. 1 shows, schematically, apparatus incorporating the present invention.

Referring to FIG. 1 there is shown a drilling machine according to the invention the basis of which is an electro discharge machine 10. A multi-wire electrode assembly 11 comprises a linear array of parallel solid wire electrodes 12. The electrodes 12 in the machine being described are rods of tungsten but other metals such as copper tungsten carbide, copper graphite alloy, graphite, tantalum tungsten alloy, or silver tantalum alloy may be used. Nominally the rods are of the same diameter as the holes to be drilled (typically 0.5 mm). A single electrode 12 is used to drill individual holes. In many instances, however, there is an requirement to form a multiplicity of holes and time may be saved by drilling all or at least several holes simultaneously using a multi-electrode head similar to that schematically represented in the drawings.

The electrode supporting head 11 is carried by a transducer output member 13 and is positioned vertically above a workpiece, generally indicated at 14, securely mounted on a worktable 15. This worktable is movable in a horizontal plane, that is transversely relative to the longitudinal axis of member 13 for the purpose of accurate positioning of the workpiece 14 with respect to the drilling electrodes 12. The worktable is moveable by rotation of two orthogonal lead screws 16a, 16b which are driven by stepper motors or servo actuators, one of which is indicated at 17.

Figure 2:
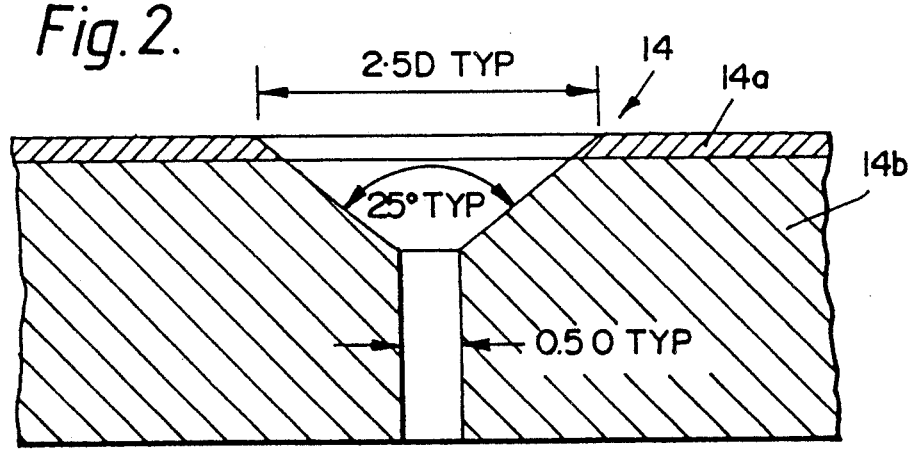
FIG. 2 illustrates one shape of the hole produced through a ceramic coated metal component using the apparatus of FIG. 1.

The workpiece 14 of the drawings is shown in section in FIG. 2 from which it will be apparent that it has a multi-layered surface construction comprising a ceramic outer layer 14a composed of substantially non-conductive material and an inner layer or substrate 14b of conductive material, that it a metal or metal alloy.

As previously mentioned the basis of the present apparatus is an EDM drilling machine. With reference to FIG. 1 the apparatus further comprises the fixed frame 18 of a drilling machine upon which the worktable 15 is carried at a convenient working height, about waist height. Integral with the fixed frame 18 is an upstanding fixed pillar 20 which carries the EDM machining head and electrode means 11.

The machining head is supported by the output member (not visible) of a servo motor 22 mounted on the pillar 20 in a vertical position. That is, servo motor 22 is arranged to mount the machining head in a vertically adjustable position immediately above the worktable 15 so that by energising the servo the head can be advanced towards, and away from, the table and a workpiece thereon.

In accordance with the invention the machining head of the apparatus of FIG. 1 includes an ultrasonic transducer 24 fixed to the vertically adjustable output member of the servo motor 22. The transducer output member of the servo motor 22. The transducer output member 13 first mentioned above belongs to the ultrasonic transducer 24 and, as already described, carries the electrode means 11. The transducer 24 is disposed on the output member of servo 22 so that the transducer member 13 is translatable vertically in the direction of its longitudinal axis, and the transducer 24 is arranged so that the member 13 is also vibrated in a vertical plane in the direction of its longitudinal axis.

A conventional, i.e. known, EDM generator and control system housed within a cabinet 26 produces electro discharge machining pulses and servo control-/energisation outputs on an output cable 28 connected with the servo 22. In addition the generator 26 determines the positive anode and negative cathode bias voltages applied to the electrode means 11 and the workpiece 14 respectively.

The ultrasonic transducer 24 is connected by a control/energisation connection 32 with an ultrasonic generator 34. The transducer 24 is electrically energised via connection 28 and the generator 34 has means for controlling both the frequency and amplitude of ultrasonic vibration.

The EDM machining process requires a supply of dielectric fluid. This is provided by means of a recirculatory system consisting of a dielectric liquid tank 36 incorporating a filter unit, a dielectric supply pump 38 which draws dielectric liquid from the tank 36 and delivers it at relatively lower pressure to a dielectric supply nozzle 40. A stream of dielectric fluid is directed by nozzle 40 into the region of the EDM machining gap, that is between the tips of the electrodes 12 and the workpiece 14. Excess and return fluid is collected in a sink 42 beolow the worktable and returned via a drain 44 and two-way valve 46 to the supply tank 36. A low viscosity mineral oil is commonly used as a dielectric fluid in electro discharge machining.

Ultrasonic drilling also requires an intermediary material of abrasive characteristics to be present between the operative surface of the vibrating machining tool and the workpiece being drilled. This may be applied in dry particulate form or as a paste directly at the contact point between the electrodes 12 and the workpiece. The material is progressively broken down to finer sizes and it is preferred in the apparatus being described to provide a recirculating supply system for the abrasive slurry similar to that for the dielectric fluid. The abrasive slurry is collected in a second tank 48 and is drawn by a pump 50 up to a second nozzle 51 also directed at the machining gap. The slurry comprises particles of diamond, carborundum or cubic boron nitride suspended in a suitable liquid which may be, for example, the sane as the EDM dielectric fluid.

The abrasive slurry is also returned to its collection tank 48 through drain 44 and valve 46. The valve 46 is directed to return machining dielectric or abrasive slurry to the appropriate tank according to the phase of the drilling sequence. The valve 46 may be controlled by an output from the EDm generator 26 to changeover automatically upon commencement of the electro discharge machining operation. The filter unit within tank 36 is of sufficiently fine mesh to remove substantially all abrasive particles which may remain in circulation after the ultrasonic drilling operation and be washed into the dielectric re-circulation system.

Alternatively, it could be arranged for the abrasive and dielectric fluid systems to share a common liquid tank and the abrasive material to be segregated by means of the fine filter.

Figure 5:
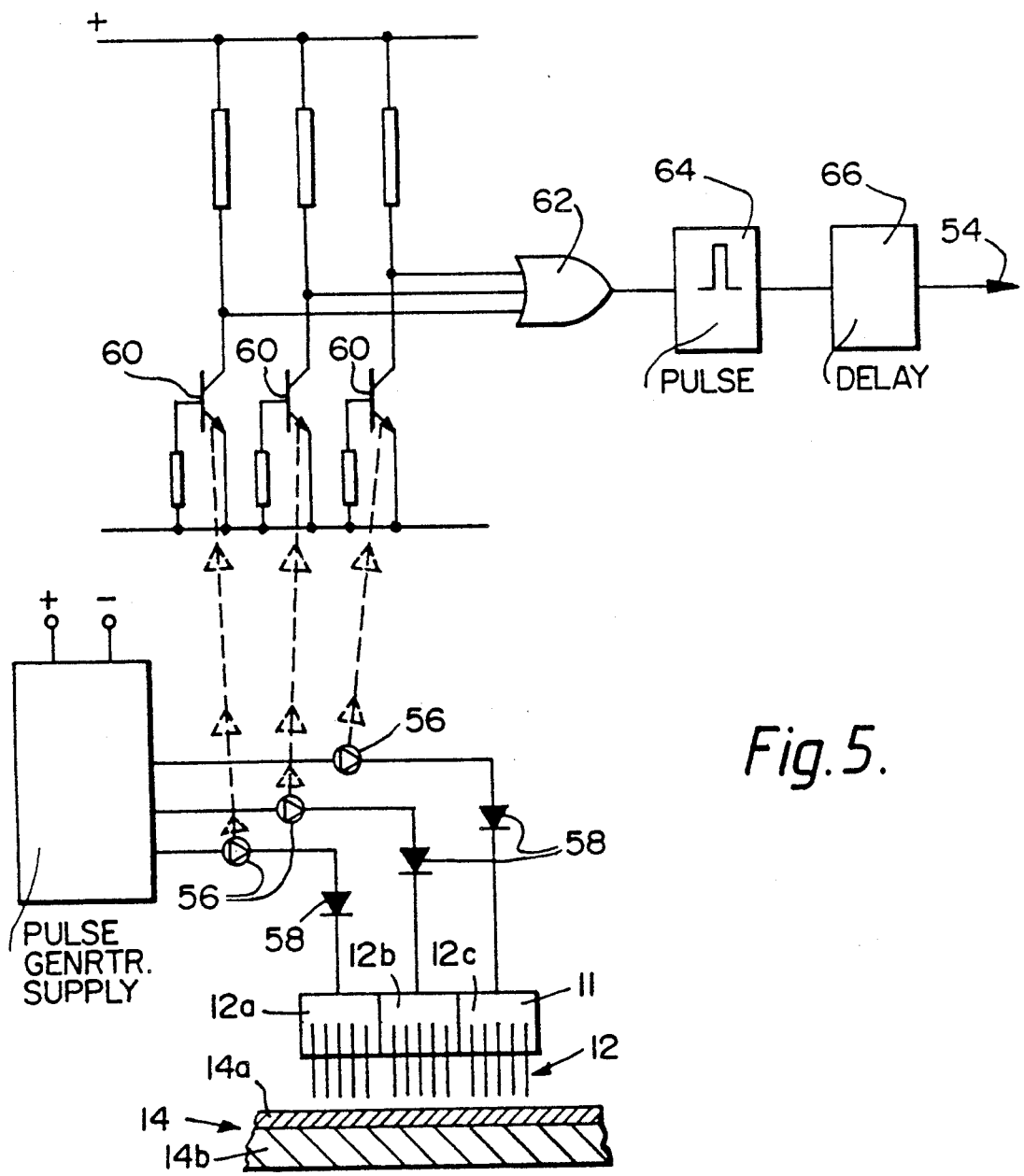
FIG. 5 illustrates the break-through detection circuit of FIG. 1.

The control system of the drilling apparatus includes a break-through detection system indicated generally at 52 and an inter-connection 54 with the EDM generator and control at 26. The break-through circuit 52 essentially comprises current sensing means responsive to electrical continuity being established between the machining electrodes 12 and the workpiece 14. FIG. 5 is a schematic diagram illustrating the essential components of a multi-channel detector system although in its simplest form, a single channel detector differs only in having one group of electrodes. The electrodes 12 are arranged in electrically parallel groups, for simplicity only three groups are illustrated in the drawing.

Each group of electrodes 12a, 12b, 12c is supplied with a positive going pulse signal through an LED 56 and diode 58 connected in series. The workpiece is biased negatively with respect to the pulse signal. Thus when electrical continuity is established between any one of the electrodes in a group 12a, 12b or 12c and the workpiece 14 current flows during the pulse mark period and the respective LED emits light. Optically coupled with each LED 56 is a light sensitive device such as phototransisters 60. Continuity through any one of the electrodes 12 in a group will trigger emission by the respective LED 56 thus stimulating the corresponding device 60 to produce an output indicating a break-through in the non-conductive ceramic layer 14a.

The outputs from individual devices 60 are logically gated by OR gating means 62 which thereby produces an output in response to the first breakthrough by any of the electrodes 12. The output from gating means 62 is connected to output pulse generating means 64 which feeds into delay means 66 to provide the final EDM control signal on connection 54.

The breakthrough detection circuit employs a pulse generator circuit which produces pulses of 10 $\mu$seconds width at a pulse repetition period of 200 $\mu$seconds. Open-circuit pulse amplitude is 25 volts falling to about 5 volts at around 0.1 ampere under break through conditions.

The EDM process employs an initial pulse of approximately 1000 volts at up to 5 amperes for a duration of between 0.1 and 5.0 $\mu$seconds. The energy contained in this initial pulse effectively clear any ceramic material remaining at the base of the ultrasonically formed hole. Thereafter the EDM process proceeds at about 150 volts at up to 120 amperes using square wave pulses of approximately 0.1 to 1000 $\mu$seconds pulse width.

In operation, a component 14 to be drilled is mounted on the worktable with the ceramic surface layer uppermost. The electrode drilling head 11 is positioned immediately above the component with a sufficient number of electrodes 12 clamped therein positioned according to the number and spacing of the required holes. The electrode head 11 is advanced towards the ceramic surface 14a until the tips of electrodes 12 lightly contact the surface.

The ultrasonic generator 34 is then energised and the abrasive slurry pump 50 switched-on to commence pumping a supply of slurry into the electrode machining gap. The action of the axial vibration at an ultrasonic frequency of an electrode in the presence of the abrasive material begins to form a hole in the ceramic layer in the axial direction of the electrode. The servo system 22 progressively advances the electrode head 11 towards the component maintaining the progressive erosion of the ceramic layer.

Meanwhile the breakthrough detection circuit 52 seeks electrical continuity between the electrodes 12 and the workpiece 14. Providing some ceramic material remains between the electrode tip and the workpiece the electrical breakthrough detection circuit remains open circuit. As soon as one of the electrodes establishes continuity this is detected by the circuit. However, the second phase of the drilling operation is delayed sufficiently long for the remainder of the electrodes to also drill through the ceramic layer.

At completion of the said delay period the EDM generator 26 is switched-on and drilling continues by a process of spark erosion. At the same time the dielectric fluid pump 38 is energised and begins pumping dielectric fluid through nozzle 40 into the machining gap. Abrasive slurry pump 50 is stopped and the two way valve 46 switched over to direct return fluid to the appropriate tank. The EDM drilling process does not require the machining electrodes to be vibrated although it is necessary for the servo 22 to advance the electrodes to maintain the machining gap within limits. This is usually done in a series of steps. However, no disadvantage has been observed if the ultrasonic vibration is continued during the EDM machining phase and the vibration transducer 24 may remain energised during the second phase of drilling.

Figure 3:
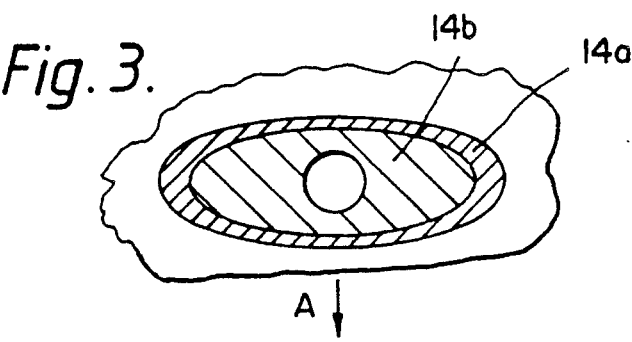
FIG. 3 is a view in the direction of arrow A in FIG. 2.

Hole shapes other than circular, straight sided holes may be formed by moving the drilling electrodes and workpiece relatively during the drilling operations. For example, the elliptical section hole of FIGS. 2 and 3 may be produced by translating the worktable carrying the workpiece in two orthogonal directions during drilling. To produce the ellipse the table is moved in directions aligned with the axes of the ellipse. In order to produce the flared or conical entry shape the movement is progressively diminished as drilling proceeds in depth. Other shaped such as slits in the ceramic layer can be produced by moving the electrodes and workpiece transversely during the first phase operation.

Figure 4:
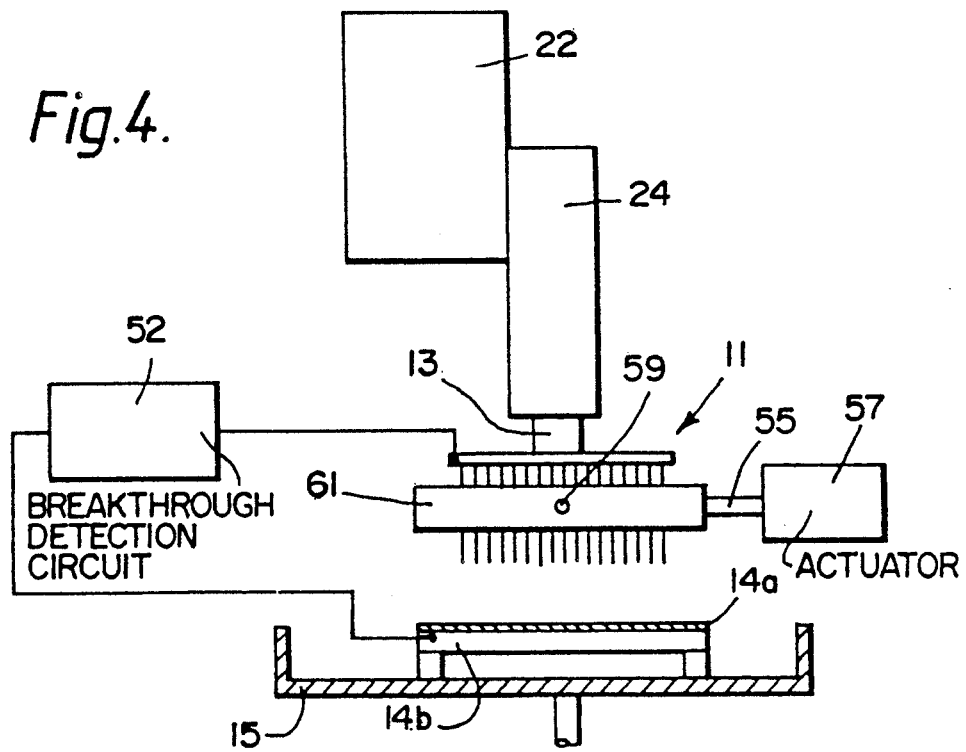
FIG. 4 shows, schematically, an alternative form of the apparatus shown in FIG. 1

Alternatively, to control the shape of hole produced during either, or both, drilling phases a modified form of drilling head illustrated in FIG. 4 may be employed. This arrangement is a modification of the apparatus of FIG. 1 and therefore like parts have been given like references. The workpiece 14 to be drilled is mounted on a worktable which as shown is fixed relative to the fixed frame of the apparatus. As before the electrode means 11 is carried on the output member 13 of an ultrasonic transducer 24 mounted on the output member (not shown) of a vertical position servo 22. The drilling head incorporates the same breakthrough detection circuit 52 connected as before.

In this arrangement, however, in order to produce relative motion of the drilling electrodes 12 and the workpiece 14 movement is imparted to the electrodes by means of actuators, one of which is shown at 57. These actuators are connected with the electrodes means 11 through actuator output members 55, 59 linked with an electrode clamping means 61 mounted for movement in orthogonal directions transverse to the direction of drilling.

In operation, the drilling procedure is essentially the same as described above and comprises ultrasonic and EDM phases. In order to produce shaped holes the transverse positioning the electrodes during the ultrasonic or both phases of drilling is controlled by the actuators such as 57 acting in perpendicular directions. Shaped holes such as that shown in FIGS. 2 and 3 can be produced. Holes elongate in only one direction may be produced by one dimensional transverse movement of the electrodes, e.g. by changing the position of one actuator only whilst the position of the other is held constant.

We claim:

1. An apparatus electro discharge machining a small hole in an electricall conductive workpiece having a substantially non-conductive surface, comprising EDM electrode means the position of which relative to the workpiece is adjustable to form a machining gap, dielectric supply means for supplying dielectric fluid into the region of the machining gap, power supply means connected in use between the electrode means and the workpiece and arranged when operative to produce machining pulses for electro-discharge machining through the conductive workpiece, ultrasonic means for imparting to the electrode means ultrasonic vibrartions in an axial direction for ultrasonically machining through the non-conductive layer, control means for sequencing the ultrasonic and EDM maching operations in separate phases, and detection means responsive to establishment of electrical continuity between the EDM electrode means and the conductive substrate to commence the electro-discharge machining phase of the conductive workpiece after breakthrough of the non-conductive layer is detected in the ultrasonic machining phase.

2. An apparatus as claimed in claim 1 wherein the EDM electrode means comprises at least one solid electrode rod.

3. An apparatus as claimed in claim 2 wherein the EDM electrode means comprises a plurality of EDM electrodes mounted in a common electrode head.

4. An apparatus as claimed in claim 3 wherein the detection means is operatively responsive to breakthrough of a first one of said plurality of electrodes.

5. An apparatus as claimed in claim 4 wherein the breakthrough detection means comprises means responsive to the passage of detection current between a drilling electrode and the workpiece.

6. An apparatus as claimed in claim 5 wherein a voltage is applied between at least one of said plurality of electrodes and the workpiece during ultrasonic drilling in order to produce the detection current when electrical continuity with the conductive substrate is established.

7. An apparatus as claimed in claim 3 wherein the electrodes are grouped electrically in several groups for the purpose of breakthrough detection.

8. An apparatus as claimed in claim 7 wherein a signal responsive to the passage of detection current produced upon said establishment of electrical continuity is produced by means of current energised light emitting means connected in series with the electrodes.

9. An apparatus as claimed in claim 8 wherein the breakthrough of a first one of said plurality of electrodes is determined by a logical OR gating means.

10. An apparatus as claimed in claim 9 wherein the inputs of the OR gating means are optically coupled with the outputs of the light emitting means.

11. An apparatus as claimed in claim 10 further comprising delay means connected with the detection means and the power supply means to delay commencement of the EDM machining phase for a predetermined period after detection of breakthrough of the non-conductive layer.

12. An apparatus as claimed in claim 11 wherein the delay period is sufficiently long to permit all electrodes to drill through the non-conductive surface layer.

13. An apparatus as claimed in claim 12 wherein the delay means is triggered by an output from the OR gating means.

14. An apparatus as claimed in claim 1 wherein the electrode means is operatively connected with ultrasonic transducer means to impart to at least one electrode of said electrode means a vibration in the axial direction.

15. An apparatus as claimed in claim 14 wherein the amplitude of movement of the ultrasonic transducer is variable.

16. An apparatus in claim 15 wherein the ultrasonic transducer is mounted on a position-servo controlled member movable in the axial direction to adjust and maintain the electrode machining gap.

17. An apparatus as claimed in claim 1 further comprising means for supplying abrasive material to the machining gap during the ultrasonic machining phase.

18. An apparatus as claimed in claim 17 wherein the means for supplying abrasive material to the machining gap is integral with the dielectric fluid supply means.

19. An apparatus as claimed in claim 18 wherein the abrasive material is carried in the dielectric fluid.

20. An apparatus as claimed in claim 19 wherein the abrasive material is mixed with the dielectric fluid.

21. A method of forming at least one small hole in an electrically conductive workpiece having a substantially electrically non-conductive surface layer, comprising two sequential phases of operation wherein in a first phase an electrode is used to form a hole in the non-conductive surface layer by ultrasonic drilling and in a second phase the electrode is used to extend the hole through the conductive workpiece by EDM machining, commencement of EDM machining in the second phase being dependent upon detection of breakthrough of the non-conductive surface layer during the first phase ultrasonic drilling.

22. A method as claimed in claim 21 for forming a plurality of holes wherein the commencement of EDM machining is dependent on breakthrough of a first electrode.

23. A method as claimed in claim 22 wherein commencement of EDM machining is delayed for a predetermined period following detection of breakthrough.

24. A method as claimed in claim 23 wherein the position of the drilling electrodes is moved transversely with respect to the workpiece in order to determine the shape of each hole drilled.

* * * * *